United States Patent [19]

Neumann

[11] 4,397,652

[45] Aug. 9, 1983

[54] PROCESS FOR THE PRODUCTION OF NEGLIGIBLY DUSTY PREPARATIONS OF DYES AND OPTICAL BRIGHTENERS

[75] Inventor: Konrad Neumann, Wyhlen, Fed. Rep. of Germany

[73] Assignee: Ciba-Geigy Corporation, Ardsley, N.Y.

[21] Appl. No.: 340,176

[22] Filed: Jan. 18, 1982

Related U.S. Application Data

[63] Continuation of Ser. No. 25,312, Mar. 30, 1979, abandoned, which is a continuation of Ser. No. 858,032, Dec. 6, 1977, abandoned.

[30] Foreign Application Priority Data

Dec. 13, 1976 [DE] Fed. Rep. of Germany ....... 2656407

[51] Int. Cl.$^3$ .......................... C09B 67/00; D06P 1/00
[52] U.S. Cl. ............................................ 8/524; 8/506; 8/586; 8/609; 8/610; 8/611; 252/301.21
[58] Field of Search ................... 8/524, 611, 506, 610; 252/301.21

[56] References Cited

U.S. PATENT DOCUMENTS 4,295,851  10/1981  Neumann et al. ...................... 8/524

FOREIGN PATENT DOCUMENTS 1425237  2/1976  United Kingdom .

Primary Examiner—A. Lionel Clingman
Attorney, Agent, or Firm—Edward McC. Roberts

[57] ABSTRACT

Described is a process for the production of negligibly dusty preparations of dyes and/or optical brighteners, which process comprises mixing an adhesive as e.g. sorbitol and a dust binding surface active agent into a mixture of dye or optical brightener and, optionally, further additives.

15 Claims, No Drawings

PROCESS FOR THE PRODUCTION OF NEGLIGIBLY DUSTY PREPARATIONS OF DYES AND OPTICAL BRIGHTENERS

This is a continuation of application Ser. No. 025,312 filed on Mar. 30, 1979, now abandoned which is a continuation of application Ser. No. 858,032, filed Dec. 6, 1977, now abandoned.

The invention relates to a process for the production of negligibly dusty preparations of dyes and optical brighteners by the addition of an adhesive and of a dust-binding agent to a specific preparation of dye or optical brightener, and also to the negligibly dusty preparation obtained by this process.

It is known that salts and other auxiliaries are mixed with dyes and optical brighteners for the purpose of diluting these. By the process of simply mixing the components together, there are obtained preparations which contain a high proportion of fine particles. These tend to create severe dust contamination, in consequence of which the handling of these preparations is rendered difficult, and possibilities of their application are therefore limited. It is also known that to overcome these disadvantages it is possible to bind the undesirable dust by, for example, adding, or applying by fine or coarse spraying, a dust-binding agent, e.g. "ESSOTEX" (mineral oil), to the mixture. But even with the addition of large amounts of a dust-binding agent, no lasting binding of the dust can be obtained in the majority of cases, particularly in the case of spray dried products. After only a few weeks the dust bond deteriorates, and a nondusty or negligibly dusty product again becomes a dusty preparation.

It has now been found that by mixing a combination of an adhesive and a dust-binding agent into a mixture consisting of at least one dye or optical brightener and optionally diluting agents there is surprisingly obtained a dust-binding action which remains constant over several months.

The dyes usable in the process according to the invention are, e.g., anionic dyes, cationic dyes, metal-complex dyes such as 1:1- and 1:2-copper complexes, 1:1- or 1:2-chromium complexes or 1:1- and 1:2-cobalt complexes, reactive dyes, disperse dyes, vat dyes, chrome dyes, pigments and direct dyes. Suitable chemical classes of dyes are, for example, nitro, monoazo, disazo, polyazo, stilbene, diphenylmethene, triphenylmethane, quinophthalone, coumarin, oxazine, azomethine or methine dyes. Particularly good results are obtained with water-soluble dyes, especially with cationic dyes.

Optical brighteners of any class can be used. They can be, for example, stilbene compounds such as cyanuric derivatives of 4,4'-diaminostilbene-2,2'-disulphonic acid or distyrylbiphenyls, coumarins, benzocoumarins, pyrazines, pyrazolines, oxazines, mono- or dibenzoxazolyl compounds or mono- or dibenzimidazolyl compounds, and also naphthalic acid imides and naphthotriazole and v-triazole derivatives. Water-soluble optical brighteners are preferred.

The dyes or optical brighteners are used in the dry form, e.g. as spray-dried or ground powders, and they can be either dusty or nondusty.

The adhesive usable in the process according to the invention are compounds which soften or melt in the temperature range of 30° to 150° C. The following are for example suitable: sorbitol, urea, hydrated dextrose, glucose, lactose, mannitol, mannose, neopentyl glycol, and polyethylene glycol having a molecular weight of above 3000. The compounds preferred are those containing at least five hydroxyl groups in the molecule.

The adhesive is advantageously used as solid powder in amounts of 2 to 10 percent by weight, preferably 3 to 5 percent by weight, relative to the total mixture. In cases where the solid adhesive is difficult to disperse, it is possible also to add a concentrated or saturated aqueous solution of the adhesive.

Depending on the employed dye or opticl brightener, suitable dust-binding agents are cationic, anionic or nonionic surface-active agents. The chosen surface-active agent must not undergo any undesired reactions with the dye or optical brightener. Nonionic surface-active agents are preferably used. Suitable nonionic surface-active agents are in particular: fatty acid ethanolamides such as oleic acid diethanolamide or coconut fatty acid ethanolamide; fatty acid amides such as coconut fatty acid amide, polyethylene glycols with a molecular weight preferably of 200 to 1000, and condensation products from fatty acids (e.g. oleic acid or ricinoleic acid), or aliphatic alcohols (e.g. octanol or decyl alcohol), or optionally substituted phenols (e.g. alkyl phenol such as nonylphenol) with ethylene oxide. Also suitable are: copolymers from ethylene oxide and propylene oxide (so-called block polymers).

The dust-binding agent is used in amounts of 1 to 10 percent by weight, relative to the total mixture.

Further additives which can be added are customary diluting agents, e.g. inorganic salts, with suitable salts being in particular those which do not soften at the temperature at which they are used, and which do not undergo with the dye or optical brightener any undesired reactions. These salts are above all alkali metal salts of strong inorganic acids, such as sulphuric acid, phosphoric acid, hydrochloric acid and carbonic acid. The following are for example used: mono-, di- and trisodium phosphate, sodium pyrophosphate, sodium chloride, potassium chloride, sodium hydrogen carbonate or sodium carbonate and preferably sodium hydrogen sulphate, and especially anhydrous sodium sulphate.

Other possible additives are diluents, particularly water-soluble organic compounds, with suitable compounds being in particular polyhydroxy compounds having a melting point above 100° C., such as sugar, cellulose or starch derivatives. A starch derivative, such as dextrin, is preferably used. Further suitable additives are moreover dispersing agents as well as acids, such as sulphonic acid or tartaric acid, wetting agents and alkaline extenders. The amount of additives depends on the desired degree of dilution of the dye or of the optical brightener, and is approximately 10 to 50 percent by weight, preferably 20 to 30 percent by weight, relative to the total mixture; it is also possible to apply mixtures of such additives. A further additive used is advantageously a diluent and/or a salt.

The actual process according to the invention comprises the vigorous and homogeneous mixing together of the components in a mixer at room temperature in the course of about 5 to 20 minutes. Suitable mixers for this purpose are, in particular, those which have incorporated mixing tools, such as intensive mixers, high-speed mixers (Lödige mixers) and kneader mixers, or high-speed stirrers using the centrifuge-whirl process. There can be added as dust-binding agent preferably a liquid dust-binding agent, either before the actual mixing of the components or during the mixing of these components.

An advantageous method of carrying out the process comprises firstly mixing the adhesive optionally with one or more additives, and subsequently mixing in the dye or optical brightener and the dust-binding agent.

By mixing at room temperature there is in general obtained a product in which the dust has been bound. It is however of advantage in some cases to heat the mixture, including the dust-binding agent, to 30° to 80° C., e.g. in a fluidised bed granulator, and to subsequently perform the mixing operation.

By the process according to the invention are obtained preparations which are negligibly dusty to non-dusty, and which retain this dust-binding action during storage over a period of months, e.g. 10 to 12 months.

The following dust test was carried out to determine the behaviour of the substance with regard to the release of dust.

Onto a metal cylinder having a capacity of 500 ccm is placed a metal funnel having an inside diameter of 10 cm and a tube (inside diameter 15 mm) of which the lower end extends down to the 200 ccm line on the cylinder. At the 400 ccm level on the cylinder is fixed a round paper filter having a hole at the centre (Schleicher & Schuell LS 14); the filter paper is moistened with water to the extent that it is moderately moist but not dripping wet. An amount of 10 g of the substance to be tested is then quickly poured through the funnel; after a waiting time of 3 minutes, the funnel is taken out and the round filter paper is removed by cutting. This filter paper is evaluated on the basis of a 5-rating scale as follows:

rating 1=highly dusty if the round paper filter is heavily tinted to intensely dyed;
rating 2=considerably dusty if the round paper filter is slightly tinted;
rating 3=moderately dusty if the round paper filter displays a large number of spots of colour which are partially touching one another;
rating 4=slightly dusty if the round paper filter displays small dots of colour but no connected spots of colour;
rating 5=negligibly dusty if the round paper filter displays a scarcely perceptible staining, with at most scattered small dots of colour.

The preparations obtainable according to the invention are used for dyeing and printing or optically brightening materials which can be dyed or optically brightened with these preparations, particularly textile materials.

In the following Examples illustrating the invention further, the term 'parts' denotes parts by weight.

EXAMPLE 1

60.8 Parts of dextrin, 1 part of sulphamic acid, 3 parts of sorbitol and 33.2 parts of a spray-dried dye (dust rating 2) of the formula

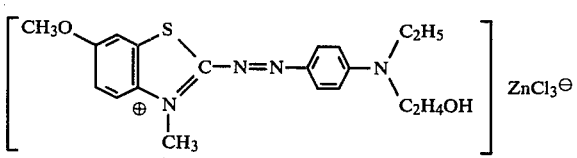

are well mixed in an apparatus provided with a rotating mixing device. There are then added 2 parts of a condensation product from 1 mole of nonylphenol with 9.5 moles of ethylene oxide (dust-binding agent). After further vigorous stirring, there is obtained within 10 minutes a negligibly dusty dye preparation of dust rating 5, which even after a storage time of six months exhibits no change in its dust-release behaviour.

Similarly good results are obtained by using, instead of the above-mentioned condensation product, the same amount of a nonylphenol having another degree of ethoxylation, as the dust-binding agent.

EXAMPLE 2

55.9 Parts of sodium sulphate, 6.7 parts of sorbitol, 0.8 part of sulphamic acid, 3.3 parts of a condensation product from 1 mole of nonylphenol with 9.5 moles of ethylene oxide, and 33.3 parts of a spray-dried dye having the dust rating 1 and corresponding to the formula

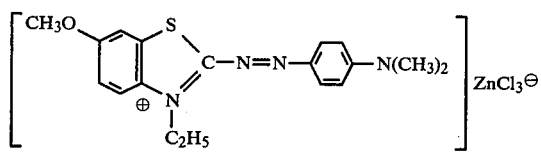

are thoroughly mixed for 10 minutes in a mixer fitted with a rotating mixing tool. There is obtained a negligibly dusty dye preparation of dust rating 5, which exhibits even after six month's storage no change in its dust-release behaviour.

Equally good results are obtained by using as the dust-binding agent, instead of the above-mentioned condensation product, the same amount of a block polymer from ethylene oxide and propylene oxide.

EXAMPLE 3

45 Parts of dextrin, 0.9 part of sulphamic acid, 6.1 parts of hydrated dextrose and 45 parts of the dried dye (dust rating 1) of the formula

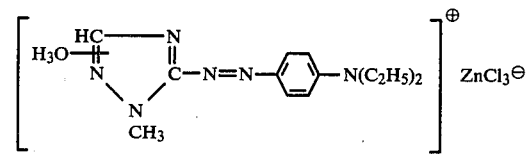

are thoroughly mixed, and 6 parts of a condensation product from 1 mole of nonylphenol with 9.5 moles of ethylene oxide are then added. By further mixing there is obtained within 12 minutes a negligibly dusty dye preparation of dust rating 5, which exhibits even after a storage time of six months no change in its dust-release behaviour.

A likewise stable and negligibly dusty dye preparation is obtained by using the dye of the formula:

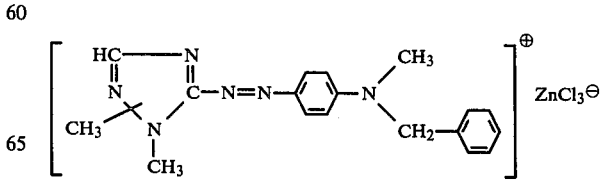

with otherwise the same processing procedure.

EXAMPLE 4

29.6 Parts of dextrin, 0.8 part of sulphamic acid, 9 parts of hydrated dextrose and 57 parts of a dried dye (dust rating 1) of the formula

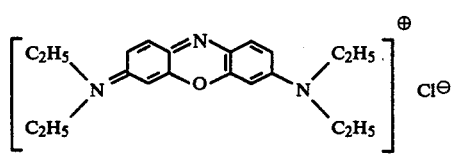

are well mixed in a mixer provided with a rotating mixing tool for 15 minutes. To the mixture are then added 3.6 parts of a condensation product from 1 mole of nonylphenol with 9.5 moles of ethylene oxide. Further intensive mixing yields a dye preparation of dust rating 5, which exhibits even after six months in storage no change in its dust-release behaviour.

EXAMPLE 5

83.4 Parts of the dry optical brightener (dust rating 5) of the formula

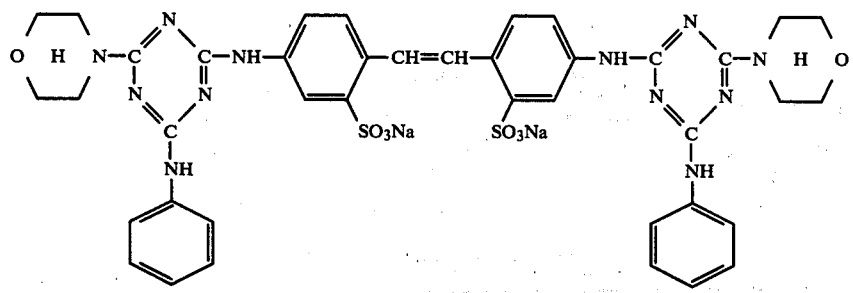

10.0 parts of a 70% aqueous sorbitol solution and 6.6 parts of a condensation product from 1 mole of nonylphenol with 9.5 moles of ethylene oxide are thoroughly mixed in a mixer for 5 minutes. There is obtained a negligibly dusty optical brightener preparation of dust rating 5, which exhibits even after a storage time of four months no change in its dust-release behaviour.

EXAMPLE 6

29.0 Parts of dextrin are mixed with 10.0 parts of sorbitol for about 5 minutes in a mixer. This mixture is mixed with 59.0 parts of the dried dye (dust rating 1) of the formula

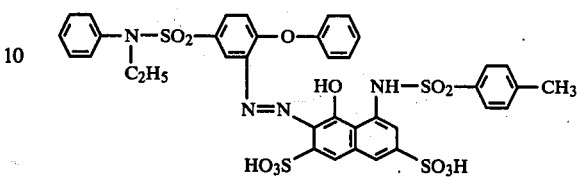

and heated to about 70° C. With thorough mixing, 2.0 parts of a condensation product from 1 mole of nonylphenol with 9.5 moles of ethylene oxide are added. After a further mixing time of 5 minutes, there is obtained a dustfree dye (dust rating 5) which, even after cooling to room temperature, exhibits a lasting dust-binding action.

EXAMPLES 7-17

85 Parts of the dyes listed in the following Table are well mixed with 10 parts of the given adhesive in an apparatus with a rotating mixing tool, and 5 parts of the listed dust-binding agent are then added. After further vigorous mixing, there is obtained within 10 minutes negligibly dusty dye preparations of dust rating 5, which exhibit even after 6 months' storage still no change in their dust-release behaviour.

| Ex. | Dye | Adhesive | Dust-binding agent |
|---|---|---|---|
| 7 | chrome complex dye CJ 15705 | neopentyl glycol | condensation product from nonylphenol and 7 moles of ethylene oxide |
| 8 | " | hydrated dextrose | condensation product from nonylphenol and 7 moles of ethylene oxide |
| 9 | vat dye CJ 69500 | hydrated dextrose | condensation product from nonylphenol and 7 moles of ethylene oxide |
| 10 | " | neopentyl glycol | condensation product from nonylphenol and 7 moles of ethylene oxide |
| 11 | " | neopentyl glycol | coconut fatty acid diethanolamide |

-continued

| Ex. | Dye | Adhesive | Dust-binding agent |
|---|---|---|---|
| 12 | (structure: diaminophenyl–N=N–dihydroxyphenyl(SO3H)–N=N–dihydroxyphenyl–N=N–phenyl–N=N–salicylic acid (COOH, OH)) | neopentyl glycol | as in Example 7 |
| 13 | " | polyethylene glycol MG 4000 | as in Example 7 |
| 14 | (structure: hydroxy-disulfonaphthyl–N=N–trihydroxyphenyl–N=N–methoxyphenyl; with –N=N–phenyl–NH–phenyl–NO2 and SO3H) | neopentyl glycol | " |
| 15 | " | hydrated dextrose | " |
| 16 | (structure: disulfonaphthyl(SO3H, SO3N)–N=N–phenyl(NHCOCH3)–NH–triazine(Cl, NH2)) | polyethylene glycol MC 4000 | as in Example 11 |
| 17 | " | neopentyl glycol | as in Example 7 |

EXAMPLES 18–21

85 Parts of each of the dyes listed in the Table are well mixed in each case with 10 parts of the given adhesives in an apparatus with rotating mixing tool, and heated to the given temperature; 5 parts of the listed dust-binding agents are then added, and the whole is vigorously mixed for the stated length of time. There are obtained negligibly dusty dye preparations (dust rating 5), which even after cooling to room temperature exhibit a lasting dust-binding action.

| Ex. | Dye | Adhesive | Dust-binding agent | Temp. | Time [min.] |
|---|---|---|---|---|---|
| 18 | (Cr complex azo dye structure with SO2CH3, COOCH3, HN–, N=N, naphthyl, Cr coordinated with O's, SO2CH3 Na⊕, charge ⊖) | neopentyl glycol | as in Example 7 | 70° | 7 |
| 19 | " | polyethylene glycol MG 4000 | as in Example 11 | 70° | 5 |
| 20 | as in Example 7 | hydrated dextrose | as in Example 7 | 90° | 15 |
| 21 | as in Example 12 | neopentyl | " | 80° | 10 |

| Ex. | Dye | Adhesive | Dust-binding agent | Temp. | Time [min.] |
|---|---|---|---|---|---|
| | | glycol | | | |

What is claimed is:

1. Process for the production of negligibly dusty pulverulent preparations of dyes, optical brighteners or mixtures thereof, which process comprises mixing an adhesive selected from the group consisting of sorbitol, hydrated dextrose, glucose, lactose, neopentyl glycol, mannitol, mannose and polyethylene glycol having a molecular weight of above 3000 and a dust-binding agent, selected from the group consisting of fatty acid ethanolamides, fatty acid amides, polyethylene glycols with a molecular weight of 200 to 1,000, condensation products from fatty acids, aliphatic alcohols, phenol or alkyl phenols with ethylene oxide, and copolymers of ethylene oxide and propylene oxide, into a preparation of dye, optical brightener or mixtures thereof.

2. Process according to claim 1, wherein an adhesive, with or without a diluting agent, is placed into a mixer, and the dye or optical brightener and the dust-binding agent are then added.

3. Process according to claim 1, wherein the homogeneous mixing together of the components is performed at room temperature within 5 to 20 minutes.

4. Process according to claim 1, wherein the product in which the dust is bound is obtained by mixing together the components at a product temperature of 30° to 80° C.

5. Process according to claim 1, wherein a water-soluble dye or optical brightener is used.

6. Process according to claim 5, wherein a cationic dye is used.

7. Process according to claim 1, wherein the adhesive is used in amounts of 2 to 10 percent by weight, relative to the total mixture.

8. Process according to claim 1, wherein the adhesive used is an organic compound having a softening or melting point in the range of 30° to 150° C.

9. Process according to claim 1, wherein the dust-binding agent used is a condensation product from an alkylphenol and ethylene oxide.

10. Process according to claim 1, wherein the dust-binding agent is used in amounts of 1 to 10% by weight, relative to the total mixture.

11. Process according to claim 1, wherein further additives used are salts, acids, extenders, wetting agents, dispersing agents or diluents, or mixtures thereof.

12. Process according to claim 11, wherein further additives used are diluents, salts or mixtures thereof.

13. Process according to claim 1, wherein sorbitol, neopentyl glycol or hydrated dextrose, with or without further additive, is mixed at room temperature with a cationic dye and a polyether alcohol.

14. The preparations obtained by the process according to claim 1.

15. Process according to claim 1, wherein the adhesive is used in amounts of 3 to 5 percent by weight, relative to the total mixture.

* * * * *